H. O. EVANS.
HOLDER FOR MACHINE TOOLS.
APPLICATION FILED FEB. 10, 1908.
938,995.
Patented Nov. 2, 1909.
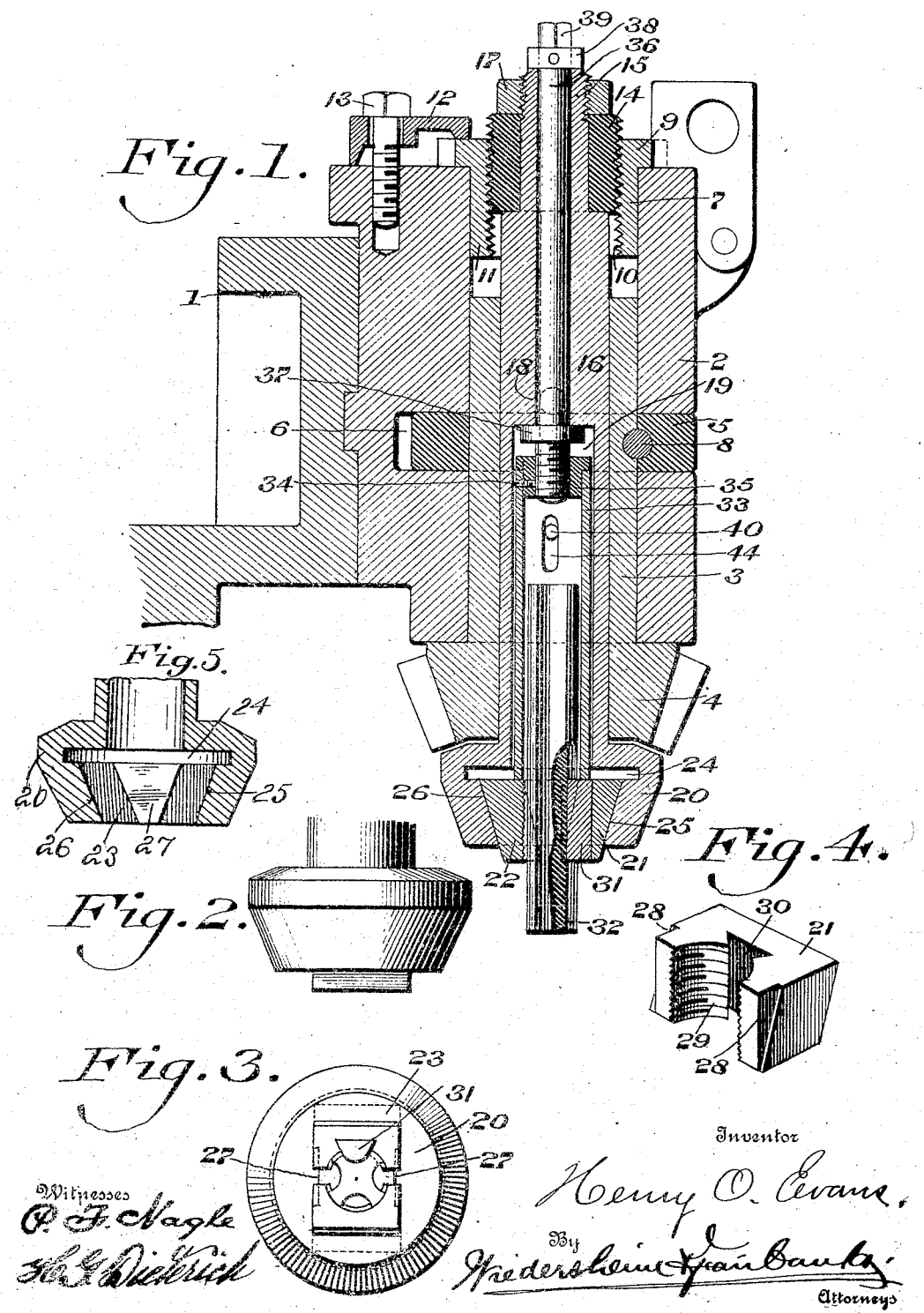
Inventor
Henry O. Evans.
Witnesses

UNITED STATES PATENT OFFICE.

HENRY O. EVANS, OF PHILADELPHIA, PENNSYLVANIA.

HOLDER FOR MACHINE-TOOLS.

938,995.

Specification of Letters Patent.

Patented Nov. 2, 1909.

Application filed February 10, 1908. Serial No. 415,015.

*To all whom it may concern:*

Be it known that I, HENRY O. EVANS, a citizen of the United States, residing in the city and county of Philadelphia, State of Pennsylvania, have invented a new and useful Holder for Machine-Tools, of which the following is a specification.

The object of my invention is to provide a holder for taps or like tools, which will clamp the tool securely and hold the same firmly regardless of the strain the tool may be subjected to during a tapping or drilling operation.

Another object of my invention is to provide clamping jaws carrying a lock member for preventing rotation of the tool relative to the jaws all so assembled as to avoid the use of set screws or devices of like character.

It further consists of other novel details of construction, all as will be hereinafter set forth.

Figure 1 represents a sectional elevation of a holder embodying my invention. Fig. 2 represents a detailed view of the clamping head. Fig. 3 represents a bottom view of the clamping head showing the jaws in operative position. Fig. 4 represents a perspective view of one of the clamping jaws. Fig. 5 represents a sectional elevation of the clamping head.

Similar numerals of reference indicate corresponding parts in the figures.

Referring to the drawings, 1 designates a portion of the frame of a machine which carries or to which is secured the head 2 adapted to form a bearing for the hub 3, carrying, at a suitable point, a driving gear 4. This hub 3 is held in position and from vertical movement by any suitable means, but preferably as shown by a collar 5, located in a slot 6 in the head 2, a locking pin 8 engaging the hub and collar to hold the same in suitable relation, by which it will be clearly seen that the hub 3 may be rotated, while any longitudinal or vertical movement thereof is prevented by the said pin 8.

On one end of the head 2, is a leader nut 7 provided with ears 9 which abut the head 2 and the portion 11 of said nut 7 internally threaded at 10 to engage a like thread on a leader 14. The leader nut 7 is suitably held in place, as shown, by means of a clip 12 secured to the head 2 by bolt 13. The ears 9 on the leader nut 7 are provided to adjust the travel of the leader 14, the adjustment being made by loosening the bolt 13 and swinging the clip to one side when the leader nut 7 may be turned by a wrench or other suitable means engaging the ears 9.

The leader 14 fits on a neck 15 of a spindle 16 and is held thereon in any desired manner, as by the nut 17. This spindle 16 has a bore 18 running through a portion of its length and has for the remainder of its length, a counter-bore 19 and terminates in a head 20 for the reception of the clamping jaws 21 and 22. The head 20 has a suitably shaped slot 23 therein which communicates with an enlarged space 24 in the base of the head 20 while the end walls of the slot 23 are beveled, as shown at 25 and 26, to form a bearing surface for the corresponding beveled sides of the clamping jaws 21 and 22. The enlarged space 24 allows the jaws to be pushed back and released from wedging action, when either or both may be removed from the head. The sides of this slot 23 have a projection 27, formed thereon, which is wedge or keystone shaped and acts as a guide to aid in the clamping action of the jaws, which are correspondingly cut away, as shown at 28 to fit this wedge projection 27. Both jaws 21 and 22 have a threaded bore 29, to provide an opening for the reception of the tool 32, in one of which jaws, as for example 21, is a recess 30, to receive a key 31 so shaped as to fit the contour of the tool and prevent any rotation thereof relative to the holder.

Within the counter-bore 19 is a tube 33 secured by means of a set screw 34, or other means, to a bushing 35 threaded on a rod 36 passing through the bore 18 and secured to the spindle 16 between the collars 37 and 38. A head 39 is formed on the end of this rod 36 in order that it may be rotated to change the adjustment of the tube 33, which adjustment is allowed for by a slot 44 in the tube 33. A pin 40 passes through this slot 44 and engages the spindle 16, in order to rotate the tube with the other parts.

It will be apparent, when a tool, as the tap 32 is placed in the jaws 21 and 22 and the key 31 properly seated therein, that any downward pressure of the tube 33 on the members forming the jaws will cause them through the wedge like action to grip the tool and hold it fast and as long as the tube 33 rests on the jaw members 21 and 22, they are securely locked against movement and the tool cannot become loose or be removed.

The tool or tap may be removed from the jaws by engaging the nut 38 on the spindle 36 and rotating the said spindle to raise the tube 33 from engagement with the jaws 21 and 22. This action frees the jaws from a downward pressure and if they are now pressed upward into the enlarged space 24, the tool may be relieved from gripping action and removed from the holder.

From the above it will be understood that my device is simple in construction and positive in its action and in the drawings I have shown one form which will operate successfully in practice although the arrangement of the parts may be varied and other instrumentalities may be employed which will come within the scope of my invention, and I do not therefore desire to be limited to the exact construction as herein shown and described.

Having thus described my invention, what I claim as new and desire to secure by Letters Patent, is:—

1. In a tool holder, a head having a slot and an enlarged space communicating therewith, the end walls of the slot being beveled, jaws therein having correspondingly beveled surfaces and coinciding tapered recesses, the sides of said slot having wedge-shaped projections engaging said recesses, one of said jaws having a recess communicating with the bore thereof, and a key fitted therein, combined with a sleeve bearing against the inner face of the jaws to exert outward pressure thereon.

2. In a tool holder, a head having a slot and an enlarged space communicating therewith, the end walls of the slot being beveled, jaws therein having correspondingly beveled surfaces and coinciding tapered recesses, the sides of said slot having wedge-shaped projections engaging said recesses, one of said jaws having a recess communicating with the bore thereof, and a key fitted therein, combined with a sleeve bearing against the inner face of the jaws to exert outward pressure thereon, a tubular spindle surrounding said sleeve and secured to said head, and means passed through the spindle and engaging the sleeve for moving it endwise to relieve its pressure against the jaws.

HENRY O. EVANS.

Witnesses:
ROBERT M. BARR,
C. D. MCVAY.